United States Patent [19]
Hiramatsu et al.

[11] Patent Number: 5,576,536
[45] Date of Patent: Nov. 19, 1996

[54] IMAGE FORMING APPARATUS INCLUDING MOTOR-DRIVEN ROTARY SCANNER AND SYSTEM FOR JUDGING IF MOTOR ROTATION COMES TO STEADY STATE AND FOR MAINTAINING ROTATION AT STEADY STATE

[75] Inventors: Koji Hiramatsu; Toshihisa Yamanaka, both of Toyokawa, Japan

[73] Assignee: Minolta Co., Ltd., Osaka, Japan

[21] Appl. No.: 291,758

[22] Filed: Aug. 17, 1994

[30] Foreign Application Priority Data

Aug. 20, 1993 [JP] Japan .................................... 5-206130
Aug. 30, 1993 [JP] Japan .................................... 5-214382

[51] Int. Cl.⁶ ........................................................ H01J 3/14
[52] U.S. Cl. ........................................ 250/236; 358/412
[58] Field of Search .................................. 250/235, 236, 250/231.17; 358/412, 413, 411, 409, 422; 340/669, 670; 73/517 A; 235/461, 462, 471, 472, 467, 476; 318/55, 58–61, 778, 779

[56] References Cited

U.S. PATENT DOCUMENTS 3,848,087 11/1974 Carrell .................................... 358/413
4,130,838 12/1978 St. John .................................. 358/412
5,008,607 4/1991 Ono et al. ............................... 358/409

FOREIGN PATENT DOCUMENTS 60-23538 6/1985 Japan .

*Primary Examiner*—Que T. Le
*Attorney, Agent, or Firm*—Willian Brinks Hofer Gilson & Lione

[57] ABSTRACT

A polygonal mirror is rotated by a brush motor, and a laser beam deflected by the polygonal mirror is detected by a sensor for generating a signal which determines a printing start position of each scanning line. The rotating speed of the motor is proportional to the frequency of the signal, and when the frequency of the signal becomes equal to a reference value, the motor can be judged to come to a steady rotation state. In a control circuit, the rotating speed of the motor is detected from the frequency of the signal, and the difference between the detected speed and a reference value is calculated and is sent to a comparator. Based on the speed difference and the back electromotive force which occurs in the motor, the comparator controls the driving voltage of the motor.

5 Claims, 12 Drawing Sheets

F I G. 6
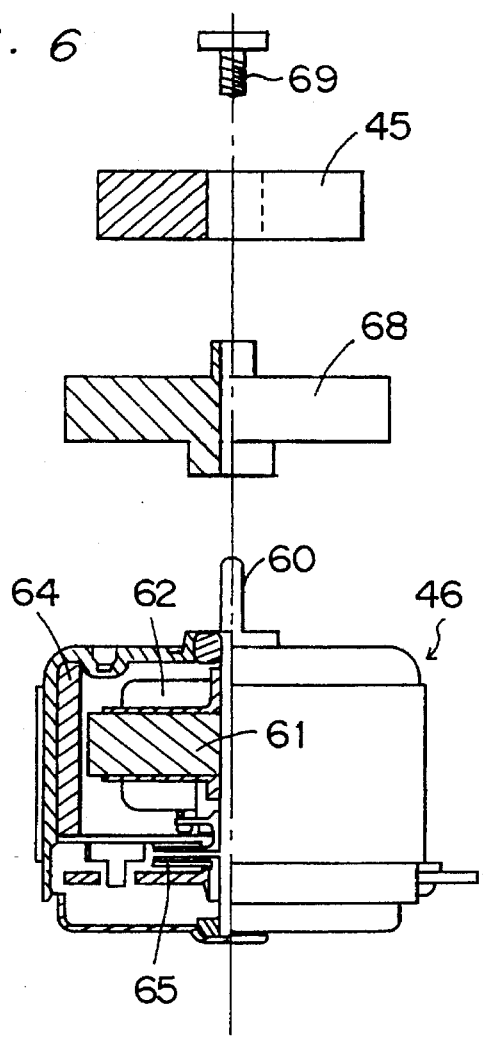
F I G. 7
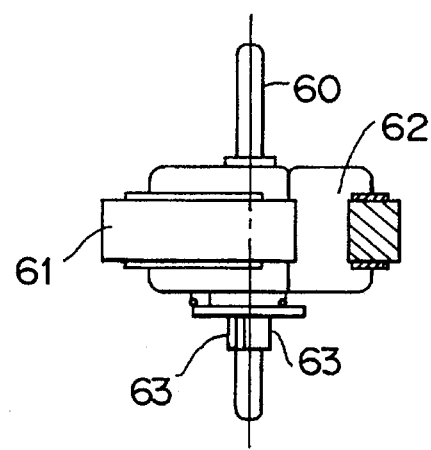

FIG. 13
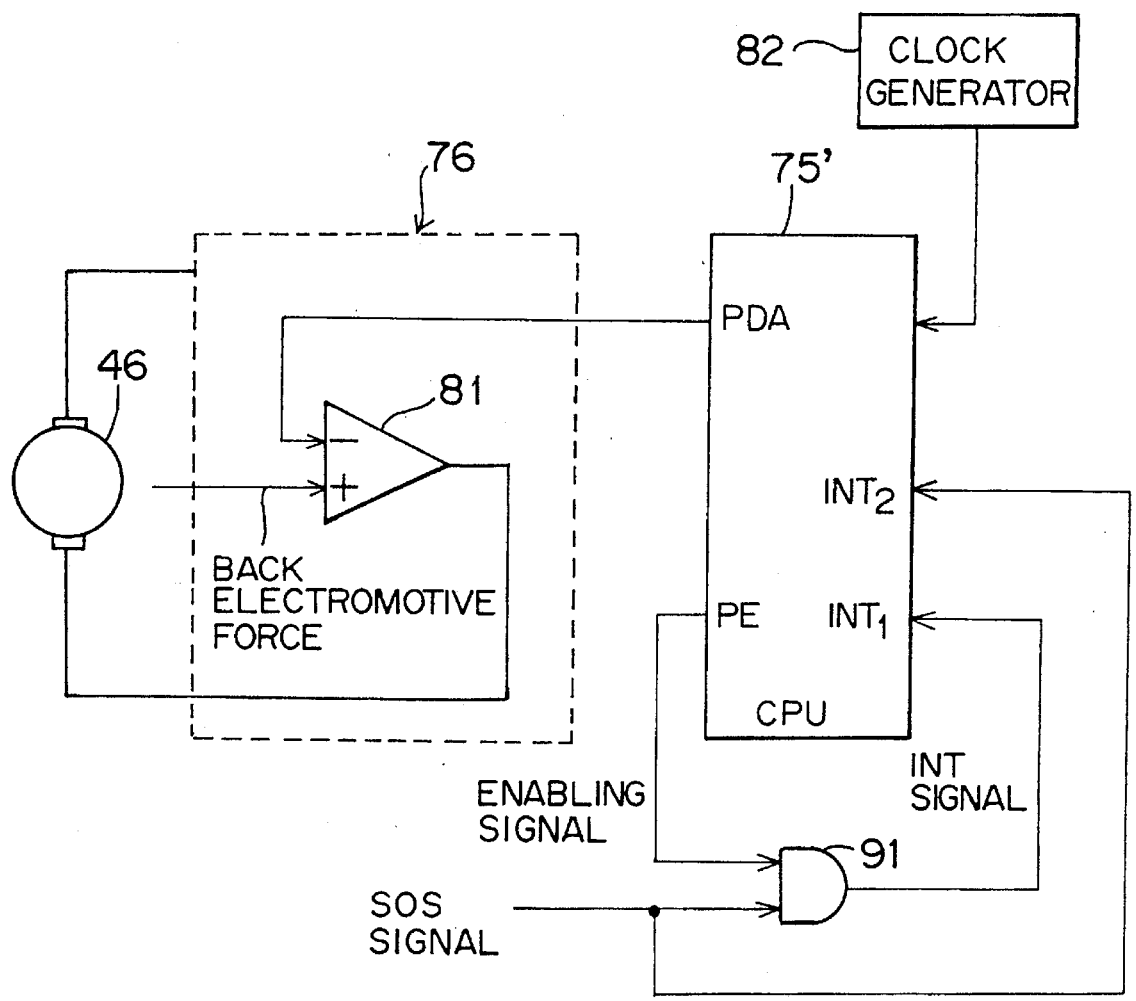
FIG. 14

IMAGE FORMING APPARATUS INCLUDING MOTOR-DRIVEN ROTARY SCANNER AND SYSTEM FOR JUDGING IF MOTOR ROTATION COMES TO STEADY STATE AND FOR MAINTAINING ROTATION AT STEADY STATE

BACKGROUND OF THE INVENTION

1. Field of the Invention

The present invention relates to an image forming apparatus, and more particularly to an image forming apparatus wherein a rotary scanner deflects a light beam emitted from a light source to scan a light receiving surface line by line.

2. Description of Related Art

A light beam scanning system provided with a polygonal mirror has been developed into various types to be used as an image writing device. The polygonal mirror is driven by a motor to rotate at a constant speed. If image writing is performed while the motor is in a startup state, wherein the rotation of the motor is unstable, and while the motor rotates at not a specified speed, image disorder will be caused. Also, if the motor cannot keep the constant speed even in a steady state, the picture quality such as the image width will not meet the requirement.

Motors are classified into brush motors and brushless motors, and a brushless motor is used to drive the polygonal mirror. Brushless motors are expensive, but they have, in a motor control circuit, check means which judges whether the motor comes to a steady rotation state and generates a lock signal when the rotation of the motor comes to the steady state. If image writing is started after the lock signal, image disorder can be avoided. Further, brushless motors are good in the accuracy of rotation.

Brush motors are inexpensive. However, they do not have such check means, and the control circuit cannot check whether the rotation of the motor is normal. Moreover, brush motors vary in the rotating speed in a steady state depending on the individualities, the temperature of the circumstances, the heating condition of the coil and the driving circuit parts, etc, and it is difficult to regulate the rotating speed. Therefore, brush motors have not been used for driving a polygonal mirror.

SUMMARY OF THE INVENTION

An object of the present invention is to provide an image forming apparatus which has a rotary scanner driven by an inexpensive brush motor and has a cheek system for judging whether the rotation of the motor comes to a normal steady state.

Another object of the present invention is to provide an image forming apparatus which has a rotary scanner driven by an inexpensive brush motor and has a control system for keeping the rotating speed of the motor in a steady state at a specified value.

In order to attain the above objects, an image forming apparatus according to the present invention comprises: a rotary scanner; a motor for rotating the rotary scanner; a sensor which receives a light beam deflected by the rotary scanner and generates an electric signal; a counter for counting occurrences of the electric signal during a specified period from a start of the motor; and a judging device which compares the result of the counter with a reference value and judges whether the motor has come to a steady rotation state.

The sensor receives the light beam reflected on a specified point of each deflecting facet of the rotary scanner and generates an electric signal. In consideration of an error in the division of the periphery into the deflecting facets of the rotary scanner, the period during which the counter counts occurrences of the electric signal is preferably at least a time required for one rotation of the rotary scanner. For example, in a rotary scanner with four deflecting facets which is designed to come to a steady rotation state at the longest during two rotations of the motor, the counter counts occurrences of the electric signal during a period required for two rotations of the motor from a start of the motor. If the counter detects the electric signal eight times during the period, the motor can be judged to come to a steady rotation state. If it is judged that the motor has not come to the steady rotation state, the apparatus is stopped, and an alarm is raised.

According to the present invention, even if a brush motor which is controlled by an electronic governor without rotation check means is used for driving a rotary scanner in an image forming apparatus, the rotation of the motor can be checked, and image disorder can be avoided. Also, in a case of using a brushless motor, the check means (the lock signal generator) can be eliminated, which reduces the cost. Further, an SOS sensor, which generates a synchronization signal to determine a printing start position of each line, can be also used as the sensor for the check of the rotation of the motor.

Another image forming apparatus according to the present invention comprises: a rotary scanner; a brush motor for rotating the rotary scanner; a sensor which receives a light beam deflected by the rotary scanner and generates a signal; a beam modulator which starts beam modulation based on the signal; a speed detector for detecting the rotating speed of the motor from the frequency of the signal; and a controller for changing supply of electricity to the brush motor based on a comparison between the rotating speed of the motor detected by the speed detector and a reference value.

The sensor receives the light beam reflected on a specified point of each deflecting facet of the rotary scanner and generates a signal. The frequency of the signal corresponds to the rotating speed of the rotary scanner, that is, the rotating speed of the brush motor. Thus, the rotating speed of the motor can be detected, and the detected rotating speed is compared with a reference value. In the present invention, the supply of electricity to the brush motor is controlled based on the comparison result such that the rotating speed of the brush motor will be equal to the reference value.

According to the present invention, even if a brush motor without rotation check means is used for driving a rotary scanner in an image forming apparatus, the rotating speed of the motor can be detected and controlled so as to become a specified reference value. Thus, the image forming apparatus can form an image which meets the requirements such as image width, etc.

BRIEF DESCRIPTION OF THE DRAWINGS

These and other objects and features of the present invention will be apparent from the following description with reference to the accompanying drawings, in which:

FIG. 6 is a half sectional view of a polygonal mirror and a polygonal mirror motor, showing the composition of the motor and the fitting of the polygonal mirror to the motor;

FIG. 7 is a half sectional view of the polygonal mirror motor, showing the internal composition;

FIG. 13 is a block diagram of a modified driving circuit of the polygonal mirror motor;

FIG. 14 is a wave chart of signals sent to a CPU of the driving circuit of FIG. 13.

DETAILED DESCRIPTION OF THE PREFERRED EMBODIMENTS

A preferred embodiment of the present invention is described with reference to the accompanying drawings. The embodiment is a laser printer provided with a light beam scanning system.

Figure 1:
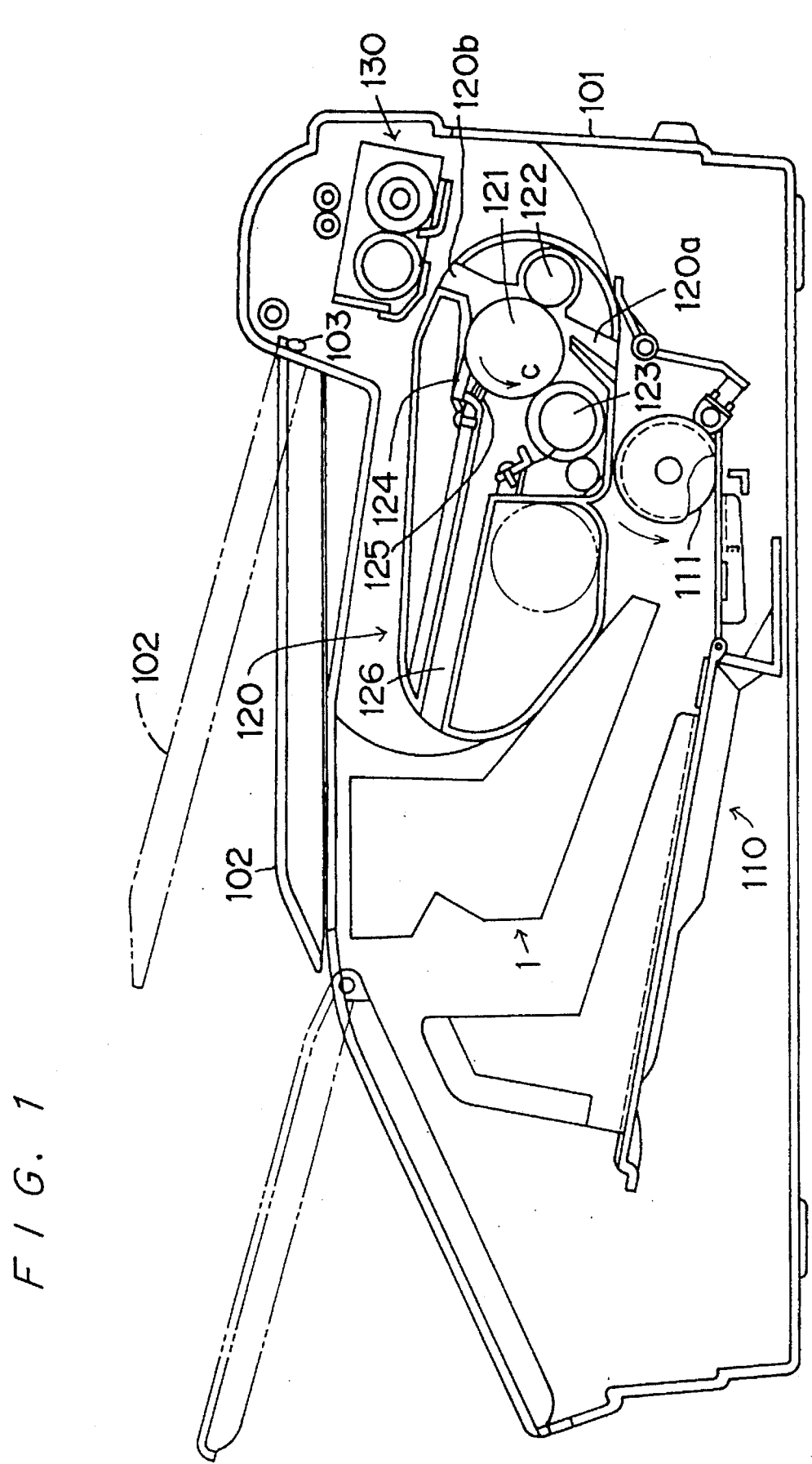
FIG. 1 is a sectional view of a laser printer according to the present invention, showing the internal composition.

Referring to FIG. 1, first, the general structure of the laser printer is described. The laser printer comprises, in a body frame 101, a laser beam scanning system 1, a sheet storage 110, an image formation cartridge 120, a fixing device 130, etc. A cover 102 is provided in an upper portion of the body frame 101 so as to pivot upward on a pin 103. The cover 102 serves as an ejected-sheet tray during printing operation, and when the cover 102 is lifted upward, maintenance of the internal parts is possible.

Sheets are stacked in the sheet storage 110, and the sheets are fed out thereof one by one with rotation of a feed roller 111 and fed into a sheet path 120a in the image formation cartridge 120.

The image formation cartridge 120 is a unit of a photosensitive drum 121, a transfer roller 122, a developing device 123, a residual toner cleaner 123, a residual charge eraser 125, etc. The image formation cartridge 120 has a slit 126 which leads a laser beam emitted from the laser beam scanning system 1 to the photosensitive drum 121, and with rotation of the photosensitive drum 121 in a direction indicated with arrow c, an electrostatic latent image is formed thereon. The electrostatic latent image is developed by the developing device 123, and the developed image is transferred onto a sheet by discharge from the transfer roller 122. The sheet which has an image transferred is fed to the fixing device 130 through a sheet path 120b, and the transferred image is fixed thereon. Then, the printed sheet is ejected onto the cover 102.

Next, the laser beam scanning system 1 is described.

Figure 2:
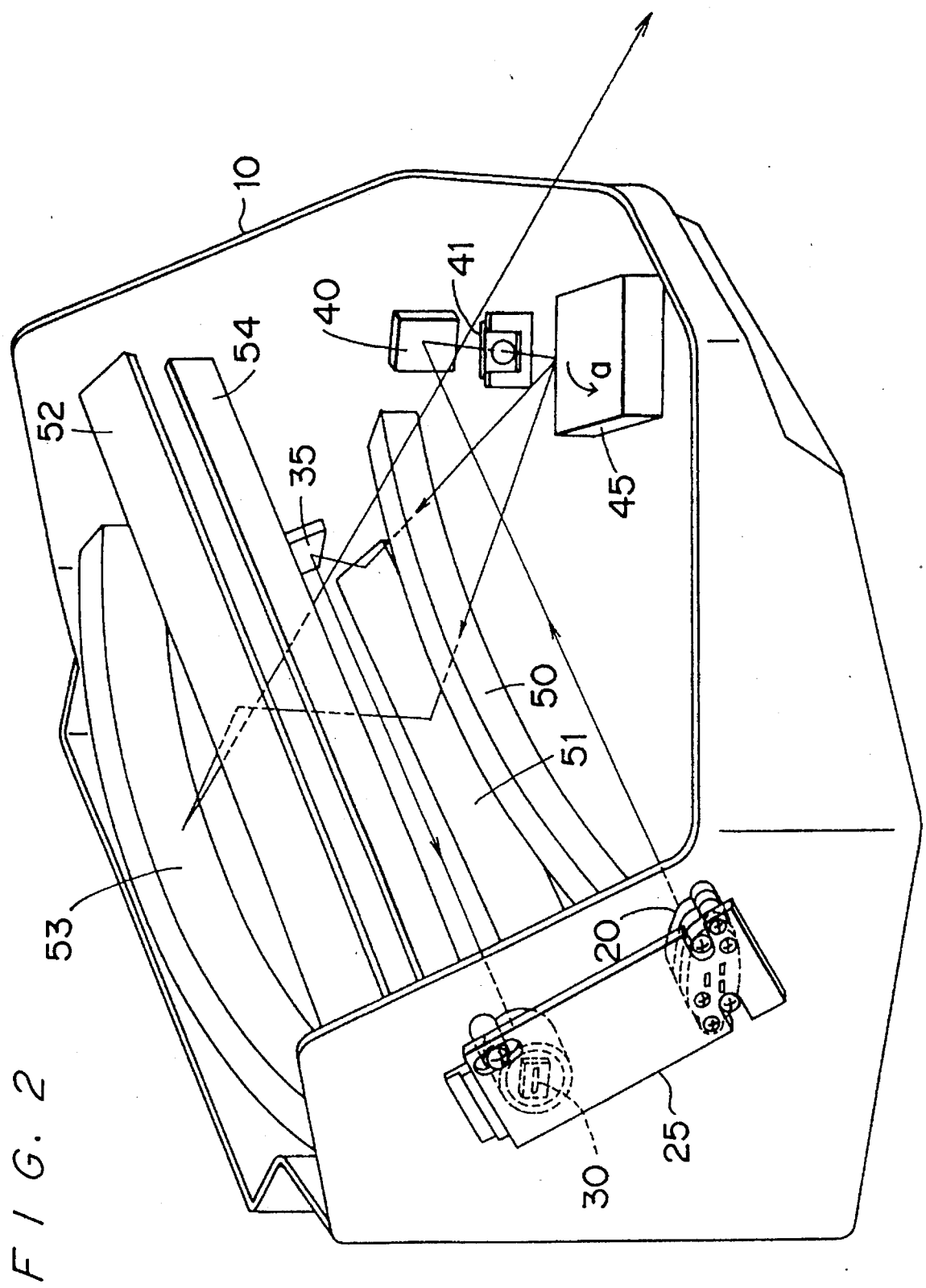
FIG. 2 is a perspective view of a laser beam scanning system provided in the laser printer of FIG. 1.
Figure 3:
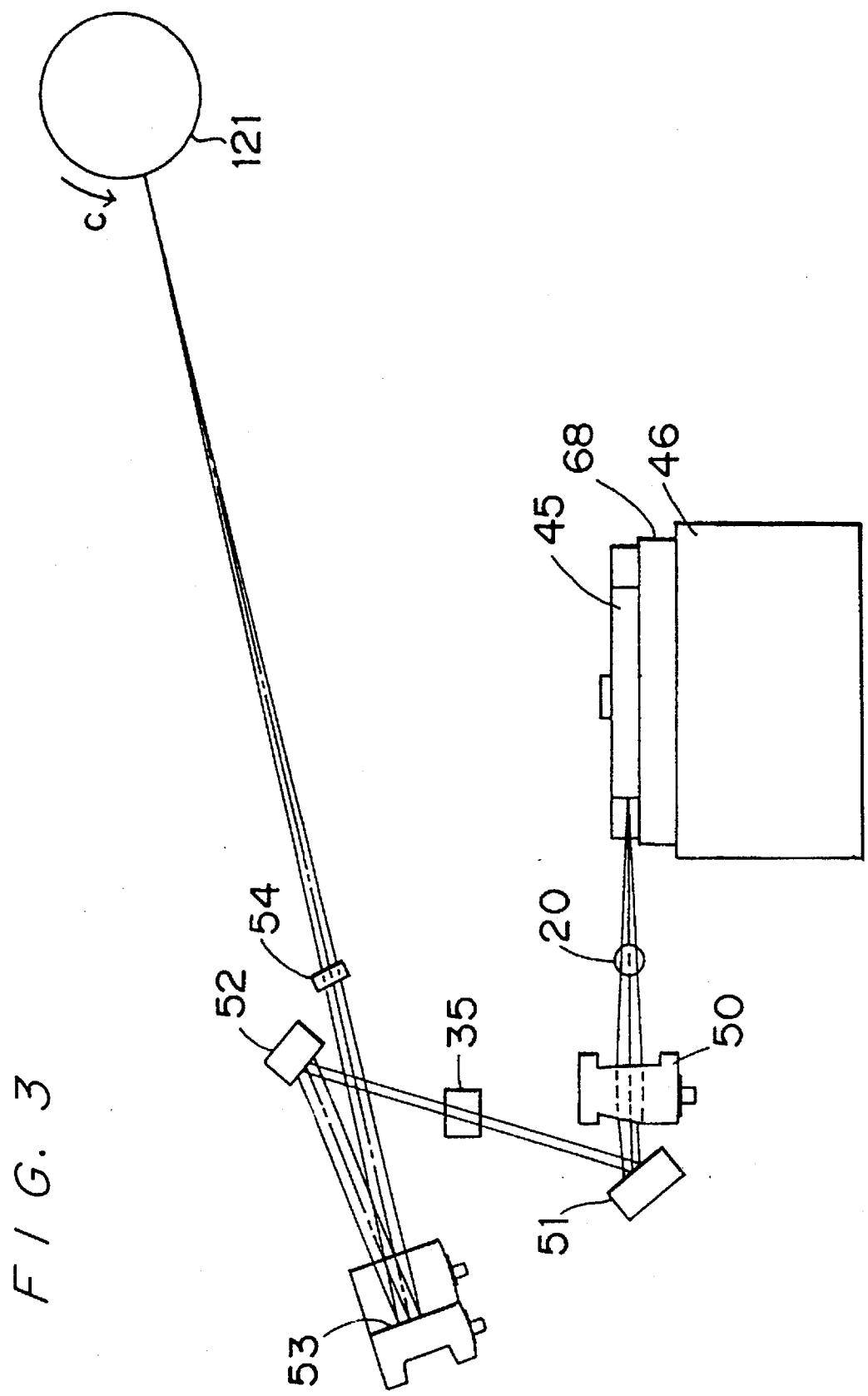
FIG. 3 is an elevational view of the laser beam scanning system, showing the optical path.
Figure 4:
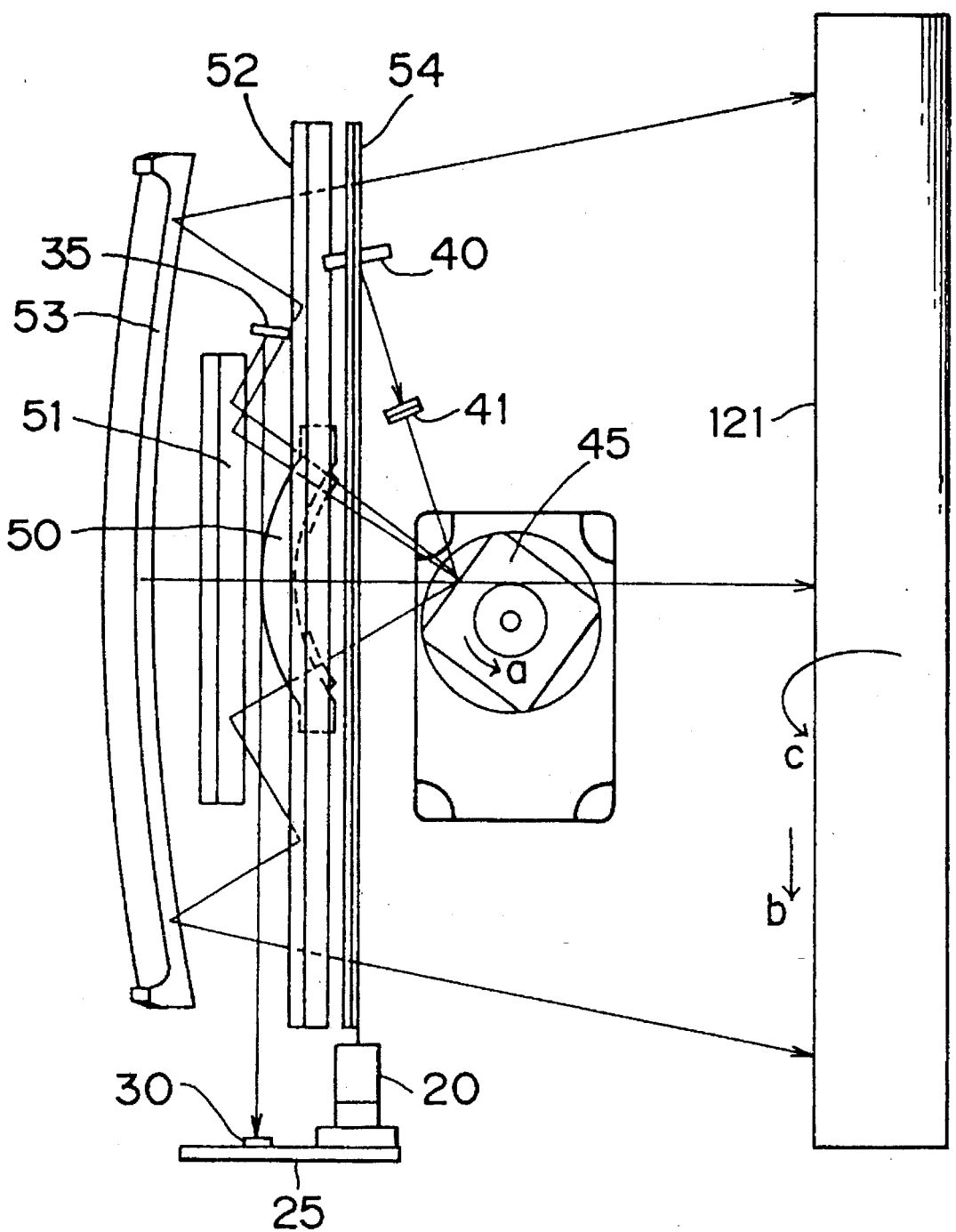
FIG. 4 is a plan view of the laser beam scanning system, showing the optical path.

FIGS. 2, 3 and 4 show the composition of the laser beam scanning system 1. The laser beam scanning system consists mainly of a housing 10 which is molded out of resin, a light source unit 20, and a photosensor 30 for detecting a printing start position (hereinafter referred to as SOS sensor), a polygonal mirror 45, a toric lens 50 and a toroidal mirror 53.

A laser beam emitted from the light source unit 20 is reflected by a plane mirror 40, passes through a cylindrical lens 41 and is incident to the polygonal mirror 45. The polygonal mirror 45 has four deflecting facets on the periphery and is driven by a motor 46 to rotate in a direction indicated with arrow a at a constant speed. Thereby, the laser beam deflected by the deflecting facets of the polygonal mirror 45 is scanned in a plane at a constant angular velocity. The scanned laser beam passes through the toric lens 50 and is reflected by the toroidal mirror 53 and is imaged on the photosensitive drum 121 via a glass plate 54. The photosensitive drum 121 is driven to rotate in a direction indicated with arrow c. An electrostatic latent image is formed on the photosensitive drum 121 with the main scanning of the laser beam in the direction of arrow b and the rotation of the photosensitive drum 121 in the direction of arrow c (sub scanning).

A plane mirror 35 is disposed after the plane mirror 51, just before the starting edge in the main scanning direction. A laser beam reflected by the plane mirror 51 at the starting edge is reflected by the plane mirror 35 and is incident to the SOS sensor 30. Based on the detection of the SOS sensor 30, a lateral synchronization signal is generated, and scanning of each line is started based on the lateral synchronization signal.

The light source unit 20 comprises, in a casing, a laser diode 71 which is a laser source (see FIG. 5), a photo-diode 72 for monitoring the quantity of light (see FIG. 5) and a collimator lens (not shown) for collimating the laser beam. The light source unit 20 is fitted on the reverse side of a circuit board 25. On the front side of the circuit board 25, elements of a control circuitry 70 of the laser diode 71 are mounted.

Figure 5:
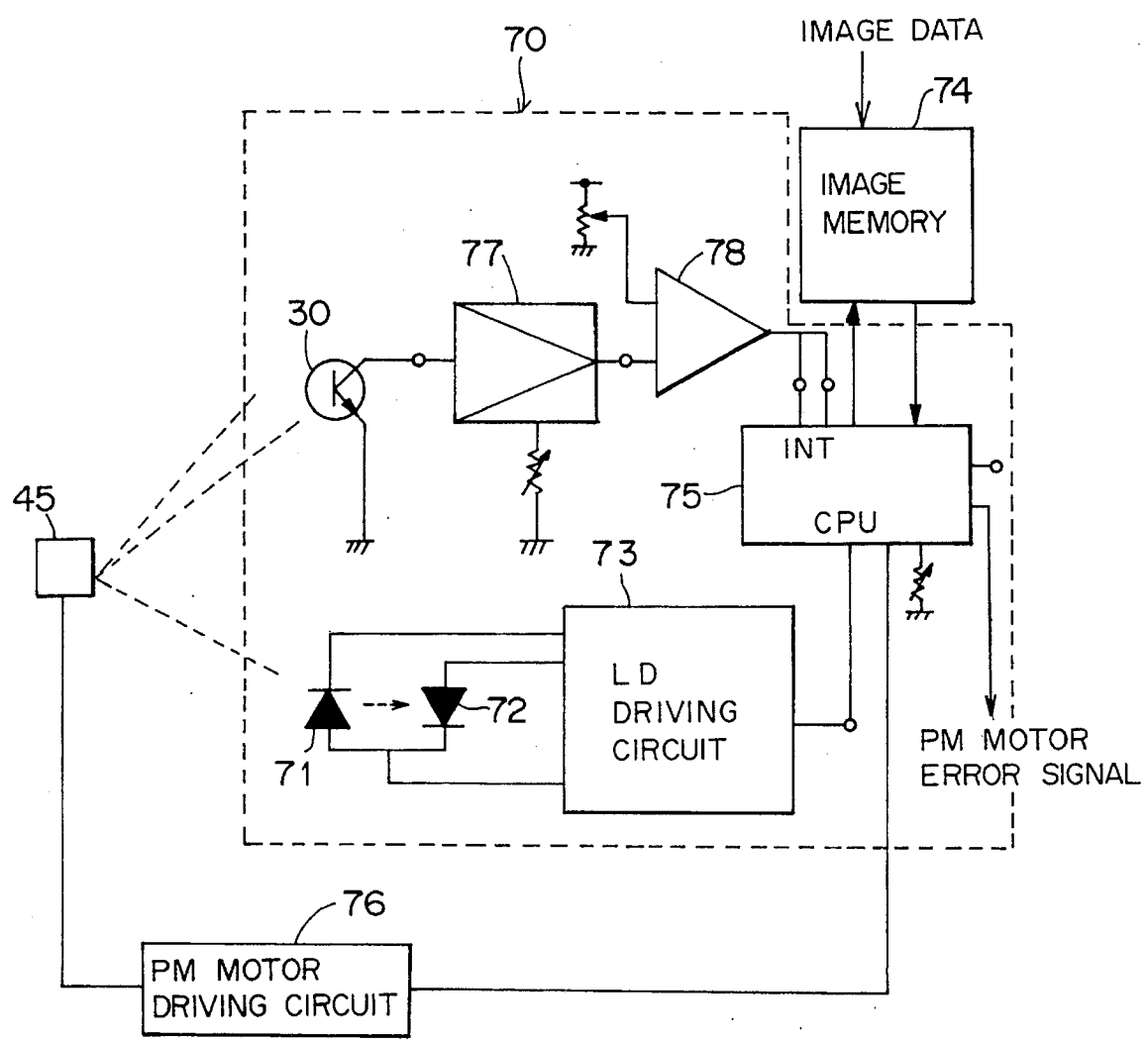
FIG. 5 is a block diagram of a control circuitry of the laser beam scanning system.

Now, referring to FIG. 5, the control circuitry 70 of the laser beam scanning system 1 and timing of switching the laser beam emission between regular emission and modulation emission.

The laser diode 71 is controlled by an LD driving circuit 73 to perform regular emission and modulation emission. Meanwhile, the quantity of light of the emitted laser is detected by feedback. More specifically, the photodiode 72 monitors the quantity of light of a rear beam of the emitted laser, and the monitored data are sent back to the LD driving circuit 73. Image data are sent from an external appliance such as a host computer to an image memory 74 and further sent to the LD driving circuit 73 via a CPU 75 which acts as a timing circuit in this embodiment. The CPU 75 also sends a control signal to a driving circuit 76 of the polygonal mirror motor 46.

The laser beam of regular emission is detected by the SOS sensor 30 in due time. Then, the detected output is amplified by an amplifier 77 and compared with a threshold voltage $V_{ref}$ (See FIG. 6) by a comparator 78. If the output of the amplifier 77 is larger than the threshold voltage $V_{ref}$, the comparator 78 generates an output of "H", and if the output is smaller than the threshold voltage $V_{ref}$, the comparator 78 generates an output of "L". The output (SOS signal) of the comparator 78 is sent to the CPU 75 through an interruption input terminal INT and through a regular input terminal.

After waiting a specified time T since the output of the comparator 78 changes from "L" to "H", the CPU 75 generates a synchronization signal and starts calling one-line image data from the image memory 74. Then, the LD driving circuit 73 drives the laser diode 71 in accordance with the image data, and thus, modulation emission is performed.

FIGS. 6 and 7 show the composition of the polygonal mirror motor 46. The motor 46 has an armature core 61 with three coils 62 and a three-segmented commutator 63a, 63b and 63c around a rotary shaft 60, and the armature core 61 is capable of freely rotate inside a magnet 64. A mirror rest 68 is pressed and fitted on the rotary shaft 60, and the polygonal mirror 45 is fixed on the mirror rest 68 by a screw 69. Thereby, the polygonal mirror 45 becomes possible to rotate with the rotary shaft 60.

The circumferences of the commutator segments 63a, 63b and 63c are in contact with brushes 65, and thereby, a current supplied from a power source 66 is lead to the coils 62. Mutual reaction of the current flowing in the coils 62 and a magnetic flux of the magnet 64 generates a torque, and consequently, the rotary shaft 60 rotates together with the armature core 61.

Figure 8:
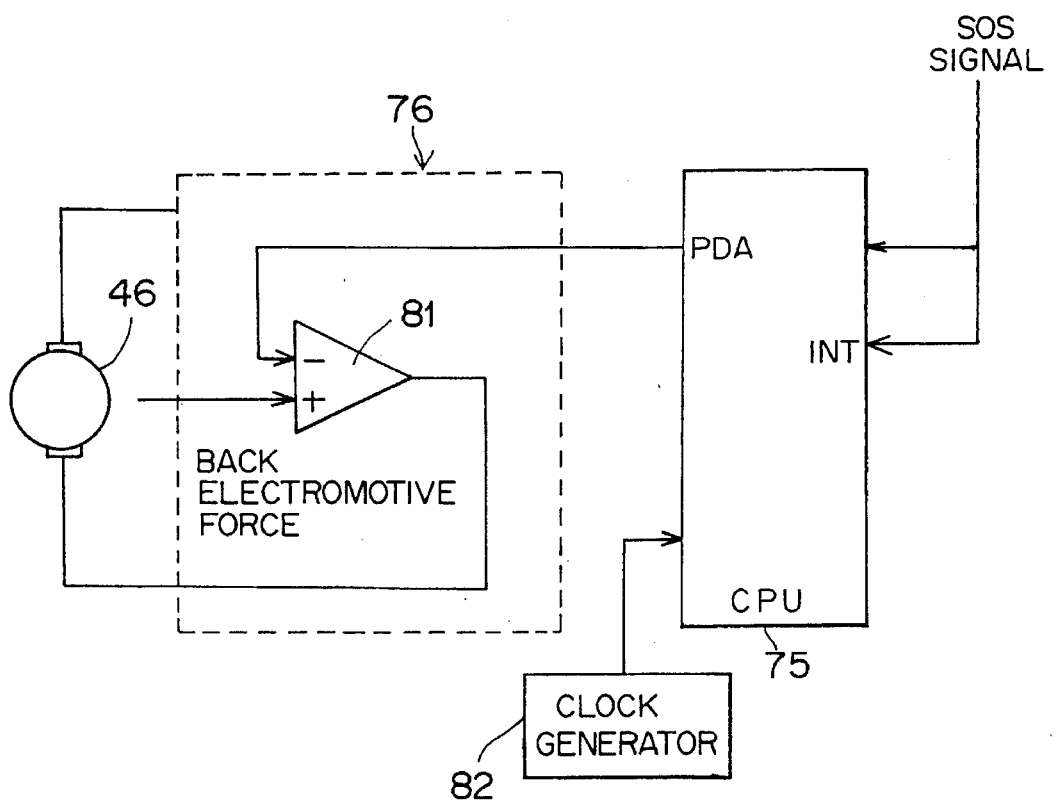
FIG. 8 is a block diagram of a driving circuit of the polygonal mirror motor.

FIG. 8 shows the driving circuit 76 of the polygonal mirror motor 46. The driving circuit 76 is switched on and off controlled by a signal sent from the CPU 75. When the driving circuit 76 is switched on, the coils 62 are supplied with a current, and the rotary shaft 60 rotates. A comparator 81 is provided in the driving circuit 76, and a back voltage which occurs on the motor 46 and a voltage setting signal from an output terminal PDA of the CPU 75 are sent to the comparator 81. The CPU 75 receives the SOS signal through the interruption input terminal INT. and through the regular input terminal. The CPU 75 has a clock signal generator 82, and the CPU 75 counts pulses of the clock signal during a period defined by the synchronization signal transmitted through the interruption input terminal INT. In this way, the CPU 75 monitors the rotating speed of the polygonal mirror motor 46.

Incidentally, an ordinary laser printer, when it is turned on or before it starts printing a first page, carries out a system check to find out whether the members of the printer body are in a normal condition. In this embodiment, the system check includes a test of the polygonal mirror motor 46 wherein it is judged whether the rotation of the polygonal mirror motor 46 is in a normal condition.

However, neither the polygonal mirror motor 46 itself nor its driving circuit 76 has any means for judging whether the rotation of the motor 46 comes to a steady state and transmitting the result to the CPU 75. Then, in the present invention, this problem is solved by using the SOS sensor 30 for the judgment.

Figure 9:
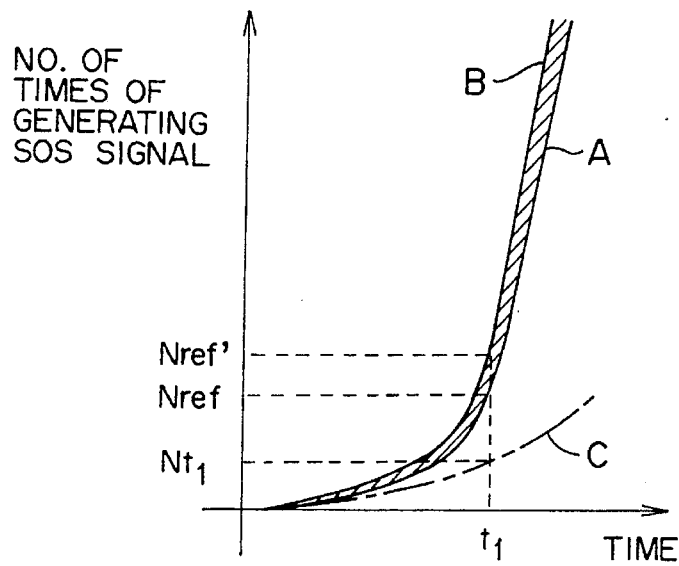
FIG. 9 is a graph showing the rotation characteristics of the polygonal motor immediately after a start of the motor.

Immediately after a start of the polygonal mirror motor 46, the rotation of the motor 46 is in a transitional state, and the rotating speed is increasing gradually. As long as the motor 46 is in a normal condition, the rotation comes to a steady state within a specified designed time. The polygonal mirror 45 rotates together with the rotary shaft 60. The SOS sensor 30 generates the SOS signal once for scanning by each deflecting facet of the polygonal mirror 45, and the frequency of the SOS signal is proportional to the rotating speed of the polygonal mirror motor 46. FIG. 9 shows the characteristic of the motor 46 in the transitional period immediately after a start of the motor 46 by using the number of times of generating the SOS signal. In FIG. 9, the x-axis denotes time, and the y-axis denotes the number of times of generating the SOS signal. The rotating speed of the motor 46 varies depending on the individualities and the conditions of the circumstances. The line A indicates a case wherein the motor 46 rotates at a lower speed, and the line B indicates a case wherein the motor 46 rotates at a higher speed. The shadowed part in FIG. 9 shows the tolerance where the motor 46 can be judged to be in a normal condition. The curved portions of the lines A and B indicate the transitional period, and as long as the motor 46 is in a normal condition, the rotation of the motor 46 comes to the steady state at the latest a time $t_1$ after a start of the motor 46.

In this embodiment, the number of times of generating the SOS signal till the time $t_1$ in the slowest case B is used as a reference value $N_{ref}$. In the system check, the times of generating the SOS signal are counted after a start of the motor 46 till the time $t_1$, and the counted value $Nt_1$ is compared with the reference value $N_{ref}$. When $Nt_1 \geq N_{ref}$, the rotation of the motor 46 is judged to come to the steady state in a normal condition, and transmission of image data to the CPU 75 and motion for a printing cycle such as sheet feeding is started. As in a case indicated by the dashed line C in FIG. 9, when the motor 46 rotates at an abnormally low speed and $Nt_1 > N_{ref}$, the motor 46 is judged not to be in a normal condition, and a polygonal mirror motor error signal is generated. This signal is transmitted to a microcomputer which controls the printer body, and the operation is discontinued, and an alarm is raised. The alarm is a sound and/or an indication on an operation panel (not shown).

The clocking, the counting of times of generating of the SOS signal and the generation of the polygonal mirror motor error signal are performed by the CPU 75.

Figure 10:
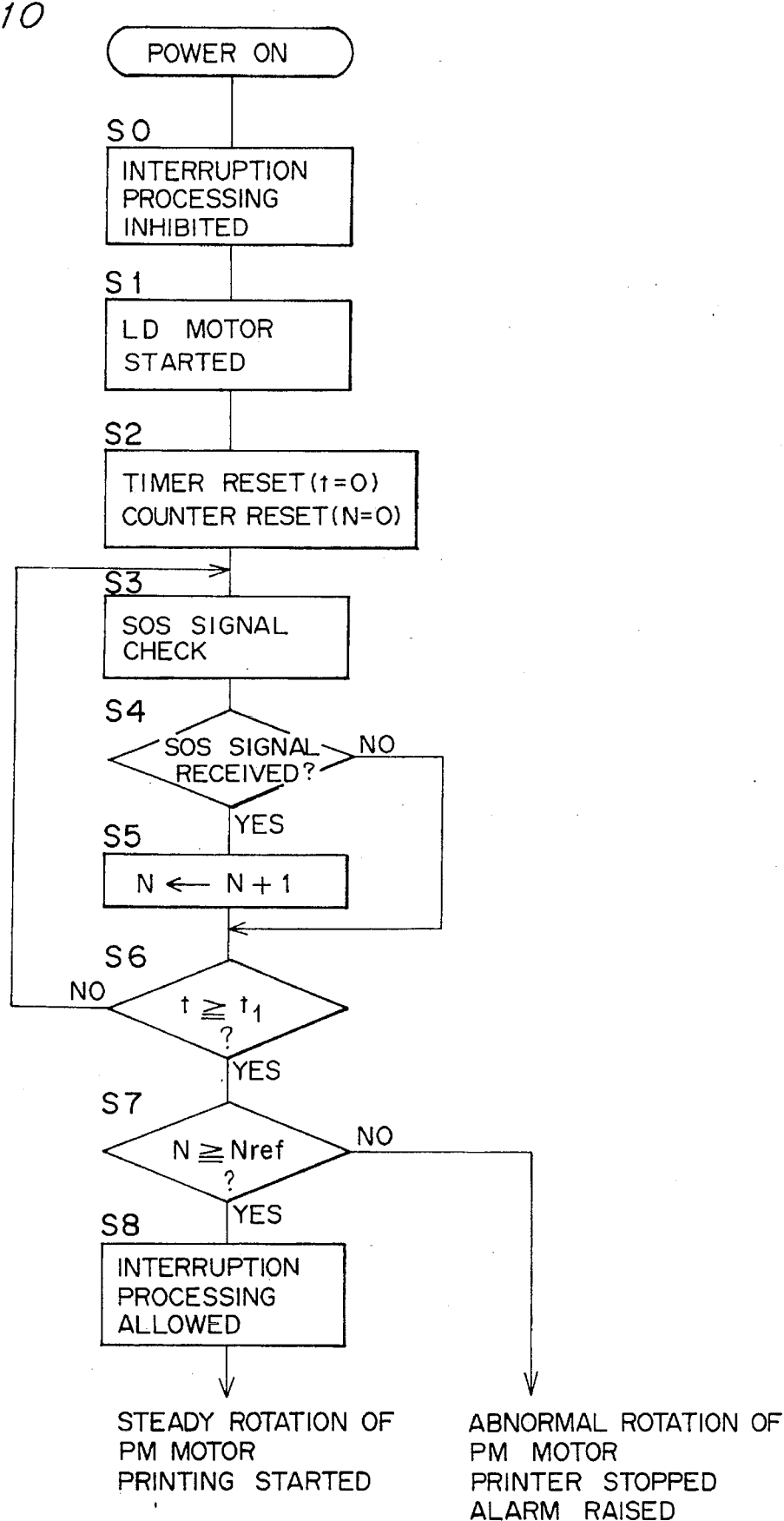
FIG. 10 is a flowchart of a procedure for checking the rotation of the polygonal mirror motor immediately after a start of the motor.

Now, referring to FIG. 10, a control procedure for checking of the polygonal mirror motor 46 is described. The CPU 75 follows the flowchart of FIG. 10.

When the printer is turned on, first interruption processing is inhibited at step S0. At step S1, the laser diode 71 is driven for regular emission, and the polygonal mirror motor 46 is started. Next, at step S2, a timer and a counter are reset. Then, it is judged at step S3 whether the SOS signal is received from the SOS sensor 30. When receipt of the SOS signal is confirmed at step S4, the counter gains an increment at step S5.

The timer value t is compared with the reference value $t_1$ (see FIG. 9) at step S6, and while the timer value t is smaller than the reference value $t_1$, the processing returns to step S3. When the timer value t becomes equal to or larger than the reference value $t_1$, the counter value N is compared with the reference value $N_{ref}$ at step S7. If the counter value N is not smaller than the reference value $N_{ref}$, the rotation of the polygonal mirror motor 46 is judged to come to the steady state, and interruption processing is allowed at step S8. Then, the microcomputer of the printer sends image data to the CPU 75, and motion for a printing cycle such as sheet feeding is started. If the counter value N is smaller than the reference value $N_{ref}$ at step S7, the motor 46 is judged to be in an abnormal condition. In this case, the CPU 75 sends the polygonal mirror motor error signal to the microcomputer of the printer. On receiving the error signal, the microcomputer stops the operation and raises an alarm.

Figure 11:
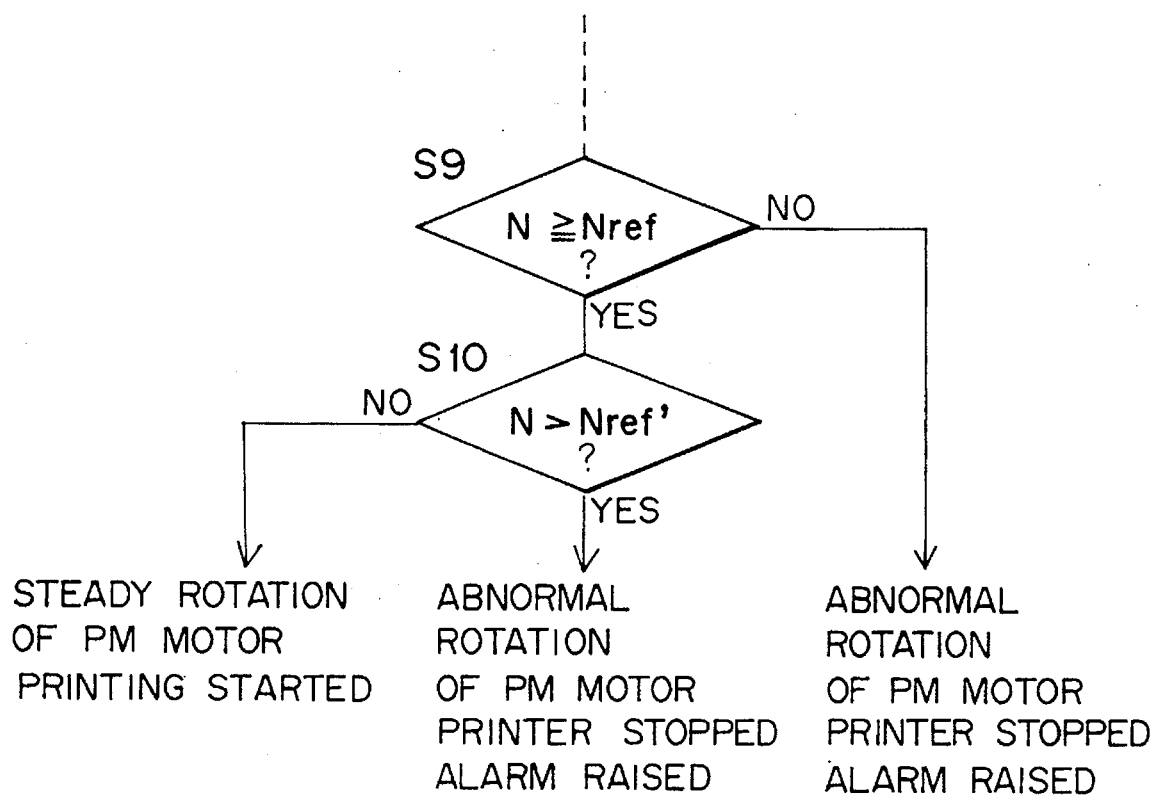
FIG. 11 is a flowchart of another procedure for the motor rotation check immediately after a start.

As shown in FIG. 11, it is possible to add a step for checking whether the rotating speed of the motor 46 is over the highest limit. More specifically, the number of times of generating the SOS signal $N_{ref}'$ at the time $t_1$ in the fastest case. A shown in FIG. 9 is used as another reference value. When the result at step S9 is "YES", the counter value N is compared with the reference value $N_{ref}'$ at step S10. If the counter value N is not larger than the reference value $N_{ref}'$, the rotation of the polygonal mirror motor 46 is judged to come to the steady state. If the counter value N is larger than the reference value $N_{ref}'$, the motor 46 is judged to be in an abnormal condition, and the CPU 75 sends the error signal to the microcomputer of the printer.

Also, it is possible to conduct the motor check a plurality of times at intervals $t_2$ which is shorter than the period $t_1$. Considering that there may be an error in dividing the periphery of the polygonal mirror 45 into the deflecting facets, these periods $t_1$ and $t_2$ are preferably longer than a time required for one rotation of the polygonal mirror 45.

Moreover, the above-described motor check control may be conducted not only immediately after a start of the printer but also immediately before printing of a first page.

Conventionally, in a brush motor, the back electromotive force which occurs in the motor is compared with a reference value by a comparator, and the voltage impressed on the motor is regulated such that the back electromotive force will be equal to the reference value. The reference value is fixed for all motors of the same model. Brush motors of the same model vary in the rotating speed within +/−0.5% depending on the individualities, within +/−0.19% depending on the drift, within +/−2.0% depending on the condition of the circumstances (mainly temperature), within +/−0.35% depending on the aging, and within a total of +/−3.04%. Thus, brush motors of a model which is designed to rotate at a speed of 3000 rpm vary in the rotating speed within +/−102 rpm.

In the embodiment, the rotating speed of the polygonal mirror motor 46 is monitored using the detection of the SOS sensor 30 as shown in FIG. 5. Immediately before one-line scanning by each deflecting facet of the polygonal mirror 45, the SOS sensor 30 detects the laser beam and generates the SOS signal. The rotating speed of the motor 46 is calculated from the frequency of the SOS signal, and the rotating speed is compared with a reference value. Further, the result of the comparison is sent back to the motor driving circuit 76 and is used for regulation of the power supply to the motor 46 such that the rotating speed of the motor 46 will be equal to the reference value.

Referring to FIG. 8, the regulation of the power supply is described in more detail. The comparator 81 provided in the motor driving circuit 76 receives a value of the back electromotive force which occurs in the motor 46 through an input terminal and receives a reference value DA transmitted from an output terminal PDA of the CPU 75 through the other input terminal. The CPU 75 counts pulses of the clock signal generated by the clock signal generator 82 during a period defined by the SOS signal transmitted through the interruption input terminal INT. The counted pulse number corresponds to the current rotating speed of the motor 46. The CPU 75 is stored with a reference pulse number corresponding to the designed rotating speed (reference rotating speed). The CPU 75 calculates the reference value DA of the back electromotive force from a comparison between the counted pulse number and the reference pulse number. The calculated reference value DA is converted into an analog signal and is sent out through the output terminal PDA to the comparator 81 as an analog signal indicating a voltage. If an eight-bit D/A counter is provided in the CPU 75, 256 values can be calculated as the reference value DA. If the reference value DA is initially set to be "128" and if a change of the reference value DA by "1" controls a change of 1 rpm, the rotating speed can be controlled within +/−128 rpm. Further, if the initial reference value 128 commands a motor driving voltage of 2.5V and causes rotation of the motor 46 at 3000 rpm, the rotating speed of the motor 46 can be controlled in a range from 2872 rpm to 3128 rpm. This control range is +/−4.3%, and this range sufficiently covers the varying range +/−3.04% caused by the individualities, the drift, the conditions of the circumstances and the aging.

Figure 12:
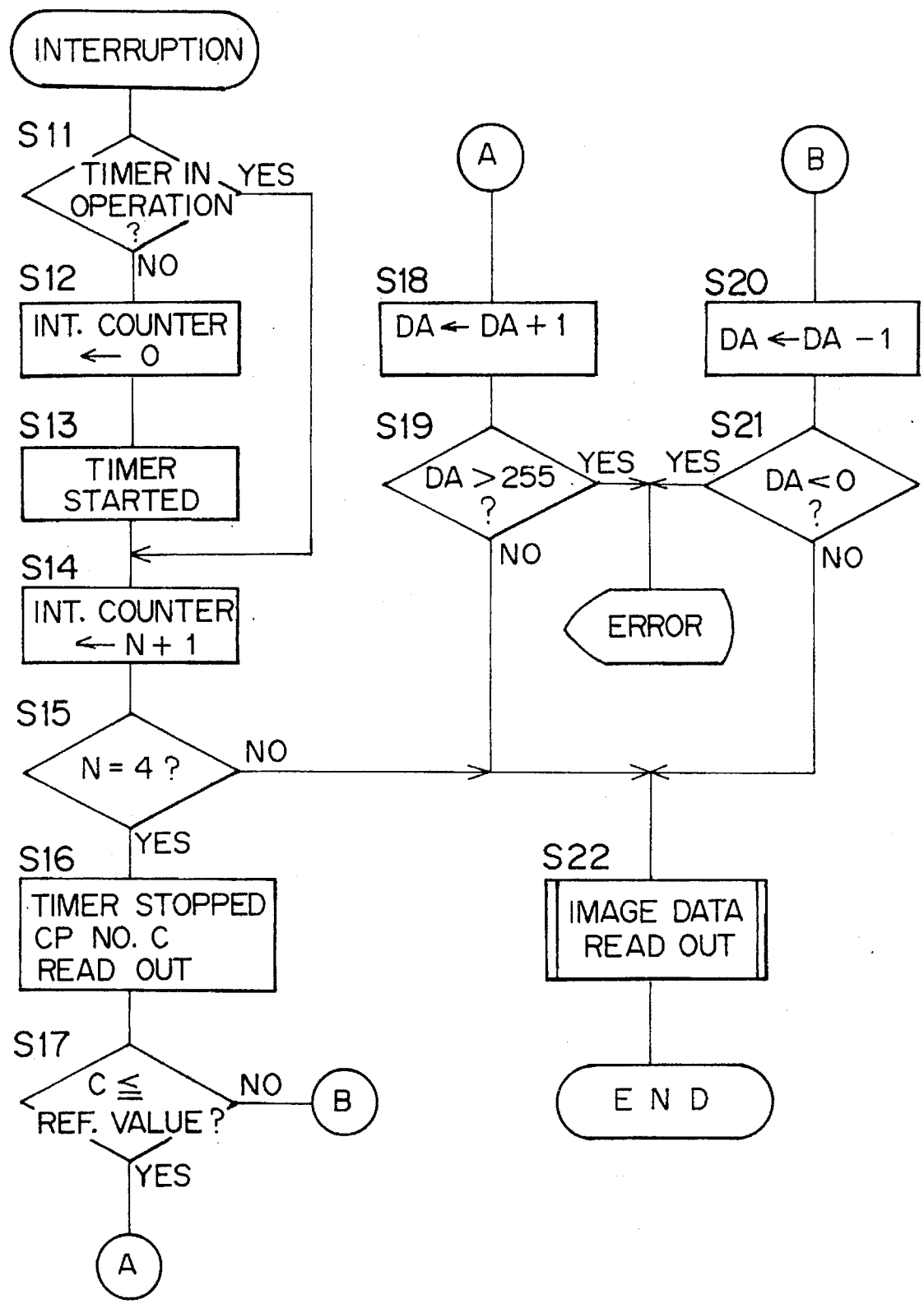
FIG. 12 is a flowchart of a procedure for controlling the rotating speed of the polygonal mirror motor in a steady rotation state.

Referring to FIG. 12, a control procedure of the CPU 75 for controlling the rotating speed of the motor 46 in the steady state is described. This procedure is carried out as interruption processing of the CPU 75.

When the CPU 75 receives the SOS signal, a timer for counting pulses of the clock signal is checked at step S11. If the timer is in operation, the processing goes to step S14 directly. If the timer is not in operation, an interruption counter for counting the number of times of receiving the SOS signal is reset to "0" at step S12. Then, the timer is started at step S13, and the processing goes to step S14.

At step S14 the interruption counter gains an increment, and the counter value N is judged at step S15 whether to be "4". If the counter value N is "4", the timer is stopped at step S16, and the clock pulse number C counted by the timer is read out. The clock pulse number C indicates the number of pulses of the clock signal during one rotation of the polygonal mirror 45 with four deflecting facets.

Next, at step S17 the clock pulse number C is compared with a reference value which corresponds to the reference rotating speed of 3000 rpm. If the clock pulse number C is not more than the reference value, the reference value DA of the back electromotive force to be transmitted from the CPU 75 to the comparator 81 is increased by "1" at step S19. On the other hand, if the clock pulse number C is more than the reference value, the reference value DA is decreased by "1" at step S20. The reference value DA is initially set to be "128" which is designed to attain a rotating speed of 3000 rpm. However, the reference value DA is increased or decreased depending on the counted clock pulse number C as described, and thereby, the motor 46 is regulated to keep the reference speed.

Further, the reference value DA is checked at step S19 or at step S21 whether to be over "255" or to be under "0". If the result at either step is "YES", which means that the current rotating speed of the motor 46 is beyond the controllable range, the CPU 75 generates an error signal. When the result at step S19 or at step S21 is "NO", one-line image data are read out of the image memory 74 at step S22.

The speed control of the motor 46 can be achieved in other ways. For example, it is possible to use a control circuit shown by FIG. 13, whose main element is a CPU 75', for a control procedure shown by FIG. 15.

In the control circuit of FIG. 13, the SOS signal is transmitted to an input terminal of an AND gate 91 and to an input terminal $INT_2$ of the CPU 75'. An enabling signal is transmitted from an output terminal PE of the CPU 75' to the other input terminal of the AND gate 91. As shown in FIG. 14, the CPU 75' generates the enabling signal at every fourth time of receiving the SOS signal, and the AND gate 91 sends an INT signal to an input terminal $INT_1$ of the CPU 75' when receiving the SOS signal and the enabling signal.

Figure 15:
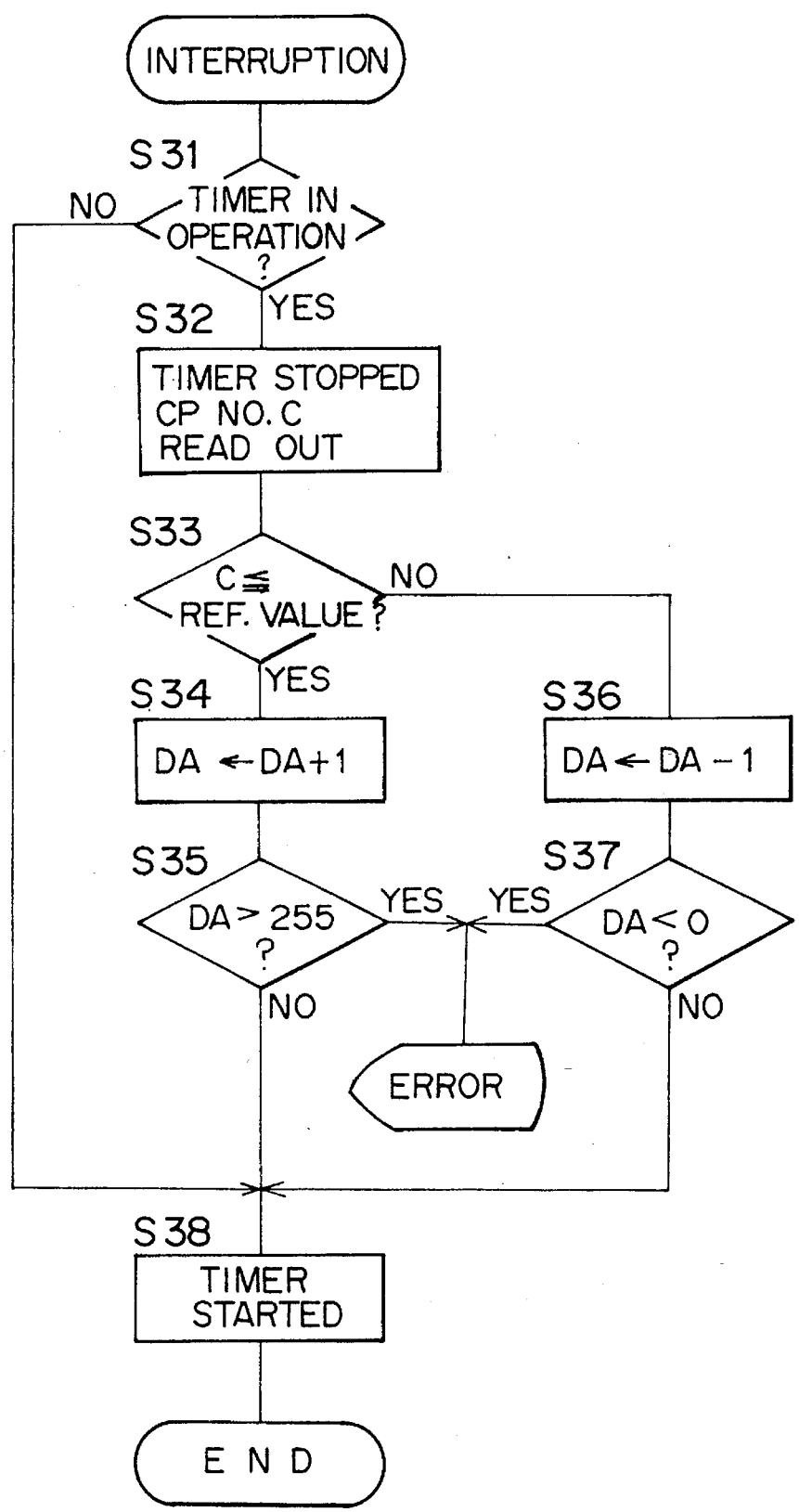
FIG. 15 is a control procedure carried out by the CPU of the driving circuit of FIG. 13.

FIG. 15 shows a control procedure performed by the CPU 75' for the speed control of the motor 46. The control procedure is carried out as interruption processing when the AND gate 91 generates the INT signal.

When the CPU 75' receives the INT signal, the timer for counting pulses of the clock signal is checked at step S31. If the timer is not in operation, the timer is started at step S38. If the timer is in operation, at step S32, the timer is stopped, and the clock pulse number C counted by the timer is read out. The clock pulse number C indicates the number of pulses of the clock signal during one rotation of the polygonal mirror 45 with four deflecting facets.

The following steps are the same as steps S17 through S21 shown in FIG. 12. The clock pulse number C is compared with the reference value at step S33. If the clock pulse number C is not more than the reference value, the reference value DA of the back electromotive force is increased by "1" at step S34. On the other hand, if the clock pulse number C is more than the reference value, the reference value DA is decreased by "1" at step S36. Further, the reference value DA is checked at step S35 or step S37 whether to be over "255" or whether to be under "0". If the result at either step is "YES", the CPU 75' generates an error signal.

The SOS signal transmitted through the input terminal $INT_2$ is used for reading image data out of the image memory 74, and this processing is carried out in another routine.

The motor speed control based on the procedures of FIG. 12 and FIG. 15 is carried out after the rotation of the motor 46 comes to the steady state. In the procedures, the clock pulse count to detect the current rotating speed of the motor is continued during one rotation of the polygonal mirror 45. In consideration of the response speed of the CPUs 75 and 75' and in order to avoid influence of detection of jitter (short periodic irregular rotation), the clock pulse count should be continued during at least one rotation of the polygonal mirror 45.

If the motor speed control is carried out during printing of one page the rotating speed of the polygonal mirror 45 may be changed, which influences the picture quality. Therefore, it is preferred to carry out the motor speed control immediately after a turning-on of the printer or at the interval between printing of one page and that of the next page.

In the embodiment, a motor with a three-segmented commutator is used as the polygonal mirror motor 46, but any other motor with any number of commutator segments can be used. Further, in the motor 46 of the embodiment, the brushes are fixed, while the commutator rotates. However, the brushes and the commutator can be made so as to rotate and to be fixed respectively.

The present invention is applicable widely to an image reader, a two-dimensional image display and the like as well as a print head of a laser printer.

Although the present invention has been described in connection with the preferred embodiment, it is to be noted that various changes and modifications are possible to those who are skilled in the art. Such changes and modifications are to be understood as being within the scope of the present invention.

What is claimed is:

1. An image forming apparatus wherein a rotary scanner having a plurality of facets scans a light beam on a light receiving surface line by line, the image forming apparatus comprising:

a motor for rotating the rotary scanner;

a sensor which receives the light beam deflected by the rotary scanner and generates an electric signal corresponding to the received light beam;

a counter for counting the number of occurrences of the electric signal during a specified time period beginning from a start of the motor; and a judging means for comparing a result of the counter with a reference value for judging whether the motor has come to a steady rotation state.

2. An image forming apparatus as claimed in claim 1, wherein the judging means has a controller which stops the apparatus and raises an alarm when the judging means judges that the motor has not come to the steady rotation state.

3. An image forming apparatus as claimed in claim 1, wherein the specified time period during which the counter counts occurrences of the electric signal is at least a time period required for one rotation of the rotary scanner.

4. An image forming apparatus as claimed in claim 1, wherein the sensor is a sensor for generating a synchronization signal to determine a printing start position of a line.

5. An image forming apparatus wherein a rotary scanner scans a light beam on a light receiving surface line by line, the image forming apparatus comprising:

a motor for rotating the rotary scanner;

a sensor which receives the light beam deflected by the rotary scanner and generates a signal corresponding to each line scanned on said light receiving surface by said rotary scanner;

a beam modulator which starts beam modulation based on the signal;

a speed detecting means for measuring time intervals of signals generated by said sensor to detect a rotating speed of the motor; and a controller for changing supply of electricity to the motor based on a comparison between the time intervals detected by the speed detecting means and a reference value.

\* \* \* \* \*